March 16, 1937.　　　E. DU BOIS　　　2,074,256
REFRIGERATING CABINET
Filed Sept. 14, 1931
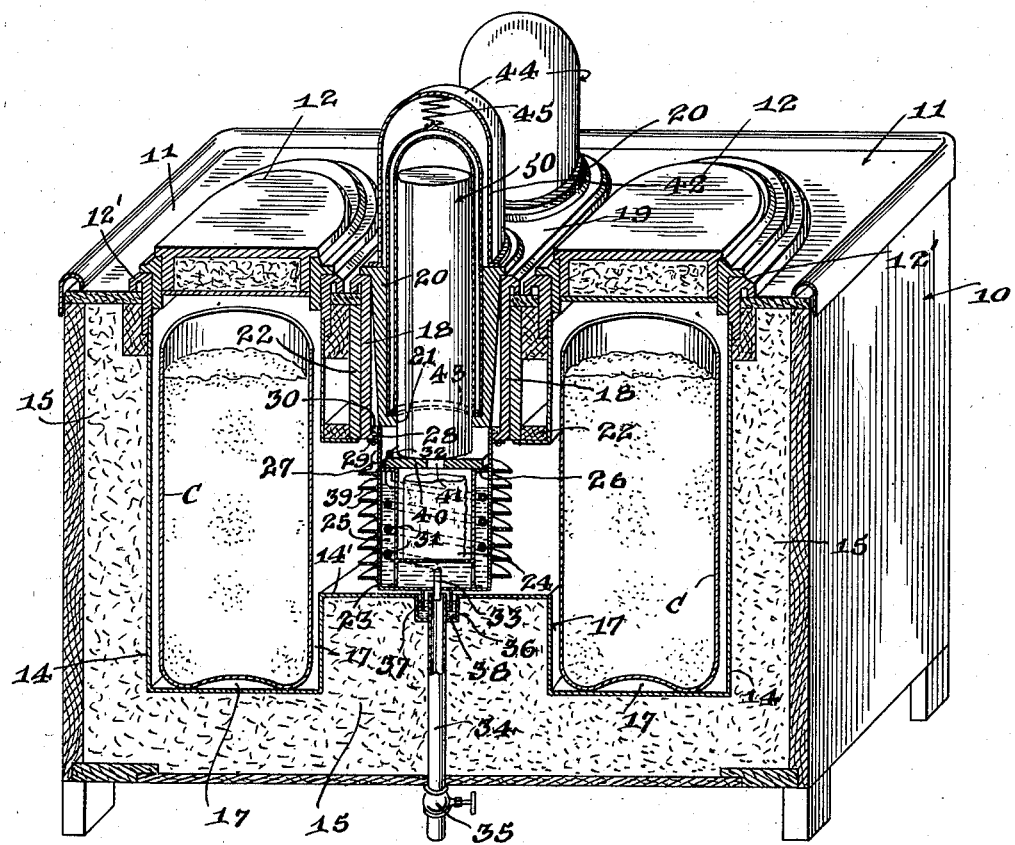

Patented Mar. 16, 1937

2,074,256

UNITED STATES PATENT OFFICE 2,074,256

REFRIGERATING CABINET

Ernest Du Bois, Itterbeek, Chateau de Pierrefonds, Belgium, assignor to International Carbonic Engineering Company, Kennett Square, Pa., a corporation of Delaware Application September 14, 1931, Serial No. 562,810
In Belgium February 10, 1931

34 Claims. (Cl. 62—91.5)

This invention relates to certain improvements in refrigerating cabinets; and the nature and objects of the invention will be readily recognized and understood by those skilled in the arts involved in the light of the following explanation of the accompanying drawing illustrating what I at present believe to be the preferred embodiment or mechanical expression of my invention from among various other forms, arrangements, combinations and constructions of which the invention is capable within the spirit and the scope thereof.

The invention is primarily directed to those general types of refrigerating apparatus, such as the so-called refrigerating cabinets, in which solid carbon dioxide ($CO_2$) is employed as the refrigerant for cooling, or lowering the temperature within the cabinet, or in the spaces or compartments formed therein to receive and in which the materials to be refrigerated are contained. Such refrigerating cabinets of the type designed for refrigerating and conserving ice cream and such like foods, are the especial concern of the invention, although it is to be understood that the invention is not limited to the type or character of the materials to be refrigerated or cooled, as the broad principles and several features thereof are of general adaptability to refrigerating apparatus irrespective of the materials which may be cooled or refrigerated therein, or for which such apparatus may be primarily designed.

Experience has demonstrated the fact that with certain food stuffs, and especially such as ice cream, the cooling or refrigerating thereof with solid carbon dioxide where the gas evolved from the sublimation of the solid carbon dioxide is allowed to come in contact with the ice cream, or in the spaces or compartments in which the ice cream is contained, results in imparting to the ice cream a slight taste and/or odor which is disagreeable to the consumer. A main characteristic of a refrigerating cabinet of my present invention, is the design and arrangement by which the solid carbon dioxide and the cold gas evolved therefrom are not permitted to enter the refrigerating or cooling spaces in the cabinet, or come into direct contact with the materials therein, but are efficiently utilized to indirectly cool and refrigerate such spaces, with the result that no carbon dioxide taste or odor is transmitted to ice cream or other food stuffs which may be placed therein.

A further feature of the invention resides in the provision and the arrangement of removable vacuum insulated holders or enclosures for receiving the charges of solid carbon dioxide, and in the mounting and location of such enclosures on and in the cabinet to project upwardly therefrom on the exterior thereof, so as to enable relatively large quantities of the solid carbon dioxide being employed without reducing the capacity of the cabinet to receive refrigerated materials, or increasing the size and bulk of the cabinet structure, all while efficiently insulating the charges of solid carbon dioxide against loss or waste.

Another feature is found in the arrangement of the cooling units within the cabinet and with respect to the charges of solid carbon dioxide, by which such units efficiently utilize the refrigerating capacity of the carbon dioxide and the low temperature gas evolved from its sublimation, to indirectly cool and refrigerate the spaces or refrigerating compartments within the cabinet; and further in the design of the cooling unit for regulating the rate of sublimation of the solid carbon dioxide by controlling the rate of flow and discharge from the unit of the cold gases of sublimation.

A further feature of the invention is presented by the provision in a cooling unit of a body of a low freezing point liquid which is primarily cooled by the cold carbon dioxide gas being passed therethrough and which absorbs heat from the refrigerating space within the cabinet to lower the temperature thereof, and in the resulting maintenance of a relatively even temperature in the cabinet by the cold accumulating and low temperature retaining and maintaining capacity of such a body of liquid.

Still a further feature of the invention is presented by a design and arrangement of refrigerating cabinet to provide a plurality of solid carbon dioxide receiving insulating holders or enclosures in cooperative thermal relation with cooling units in the cabinet, so that, the holders or enclosures can be alternately filled with refrigerant charges to thereby enable a constant and relatively even refrigeration and cooling of the cabinet; and further to provide a cooling unit to receive any residue of solid carbon dioxide from a holder when a fresh charge is placed in the holder, so as to utilize such residue in lowering the temperature of the low freezing point liquid in the unit.

Another feature of the invention is the provision of a design and construction of such a refrigerating cabinet which is of mechanical and structural simplicity, having a minimum of weight and occupying a minimum of space, relative to the refrigerating capacity and the quantity of material to be refrigerated which it is capable of receiving, and in which the solid carbon dioxide refrigerant employed therein is utilized in a highly efficient manner with a minimum of loss.

The invention also embodies and presents as a feature thereof, the novel method utilized in indirectly refrigerating a space or compartment through the sublimation of solid carbon dioxide and the utilization of the low temperature gases of sublimation to refrigerate such a space or compartment without entry of the gases therein, while controlling such gases to regulate the rate of sublimation of the solid carbon dioxide and the resulting refrigeration of the space or compartment.

With the foregoing general features and results in view, as well as certain others which will be readily apparent and recognized from the following explanation, the invention consists in certain novel features in construction and combination of elements, and in certain novel steps making up the method, all as will be more fully and particularly referred to and specified hereinafter.

The accompanying drawing is a vertical transverse section through a cabinet shown in perspective, embodying the several features of the invention.

A possible form and expression of the invention is disclosed in the accompanying drawing by way of example and not of limitation, as presenting and providing a refrigerating cabinet of the type especially adapted for refrigerating and conserving ice cream and such like food stuffs. In the illustrated example hereof, the cabinet 10 is substantially rectangular in shape and has the top wall 11 thereof formed with the elongated spaced and parallel openings therein closed by the removable covers or closures 12, which are preferably of efficiently heat insulated construction. Each of the openings normally closed by a cover 12 is of such a width as to receive a can or container C, which are usually of standard size, and of a length to receive at least two, in the present instance, of such cans. The covers 12 are so constructed as to relatively closely fit and seat upon the rims or seats 12' secured in and around the cabinet openings, to form as tight and leakproof a fit as possible to prevent heat transfer into the cabinet.

An inner wall or metal lining 14 is secured within the cabinet 10, spaced from the outer opposite side and end walls and the bottom wall thereof, and extends upwardly to and is suitably joined with the top wall 11 around the opposite outer sides, respectively, and across and adjacent the opposite ends, respectively, of the spaced openings in top wall 11. The spaces between the inner wall or lining 14 and the opposite side and end walls and bottom wall of the cabinet 10, are filled by any suitable heat insulating material 15, so that the inner space or compartment within and formed by lining 14, is surrounded and protected by such insulation against loss of cold. The bottom wall or floor of the metal lining 14 is raised throughout the portion thereof lying below the top cabinet wall 11 between the spaced can receiving openings closed by covers 12, to form the elevated platform 16 intermediate and defining at opposite sides thereof the can receiving wells 17.

The top wall 11 of cabinet 10 is provided with an opening therethrough between the can receiving openings and their covers 12, which opening is defined by and provided with the depending vertical wall 18 therearound having the top wall 19 forming a cover across and over the opening, wall 18 and cover 19 being under certain conditions removable as a unit from their normal installed position. The cover wall 19 is formed, in the present instance, with two spaced circular openings therethrough into which are removably fitted the depending tubular or sleeve members 20, each of which depends a distance between opposite sides of wall 18 and terminates a slight distance above the lower edges thereof in the inwardly extending horizontal flange forming an annular shoulder 21 therearound. Preferably, a vertical insulating wall structure 22 is formed depending from the cabinet top wall 11 along each outer side of the wall 18 and filling the space between such wall and the adjacent can receiving compartments at opposite sides thereof.

Below each of the circular openings in cover 19, in which the depending sleeve members 20 are respectively mounted, the invention provides a cooling unit, which includes a double-walled container 23 mounted and supported on the elevated or raised platform 16 of the cabinet lining 14, and providing the open-top space or compartment 24 within and surrounded by the double walls of the container. The space within the double side and bottom walls of container 23 is filled with a suitable low freezing point mixture, such as the brine solution 25, and this brine filled space is closed at its upper end around the container by the top wall 26. The outer wall 27 of each container 23 is extended upwardly to and a distance above the lower ends of depending walls 18, which walls are provided with an inwardly turned flange 28 extending around each container. The upwardly extended outer wall 27 of each container is attached and secured to wall flange 28, by the exterior flange 29 therearound, which is bolted or otherwise suitably secured to each adjacent and concentric flange 28.

In order to close and seal the space within walls 18 above each container 23, from the remainder of the space, including the can receiving compartments, within cabinet 10, a suitable curved transverse wall (not shown) can be provided across and between the spaced side walls 18 around the inner side of the container 23, it being understood of course that the adjacent curved end portion of the wall 18 extends around the adjacent outer side of such container. In this way a continuous wall 18 is formed around, spaced from and concentric with each depending sleeve member 20, and joined by flange 28 to container flange 29. For the purpose of providing a gasproof joint between the walls 18 and each cooling unit container 23, melted paraffine or other suitable material 30 is poured into the space between container wall 27 and the walls 18, over and covering the joint between flange 28 and flange 29, around the container.

Around each container 23 between the double walls thereof, immersed in the body of brine 25, is a spiral gas circulating pipe or coil 31 having a vertically disposed upper or intake end 32 extending upwardly through top wall 26 of the container and into the space thereabove. The coil extends downwardly around the inner wall of the container and terminates in the outlet pipe 33 depending downwardly through the bottom wall of container 23. The outlet pipe 33 of each coil 31, is placed in communication with and discharges into the upper end of the vertically disposed pipe or conduit 34 extending downwardly through the cabinet insulation 15 and outwardly through the bottom wall of the cabinet 10 to atmosphere. The lower end of conduit 34 is provided with a valve 35 for controlling and regulating the discharge of cold gas therefrom, as will be later explained.

A detachable and gas tight connection is formed between the lower end of each coil pipe 33 and the upper end of pipe or conduit 34, to enable ready removal of the cooling units, including the containers 23 thereof. Such a detachable connection may take the form of the example hereof, in which a well 36 is formed in the raised wall 16 of metal lining 14 around the upper end of each conduit 34, and a depending annular wall or ring 37 is provided on the bottom of each container 23, concentric with and spaced from coil pipe end 33. This ring 37 depends into the well 36 around and spaced from pipe 34 and from the bottom of the well. The wells 36 are each filled with paraffine or the like 38, to a level above the lower end of ring 37, thus effectively sealing the connection between conduit 34 and pipe 33 which extends into the upper end thereof. In this manner a detachable joint is formed which permits of a container 23 with pipe 33 being simply lifted and removed from position and detaching pipe 33 from conduit 34. To replace a container 23, it is placed in position with pipe 33 in the upper end of conduit 34, paraffine 38 having been melted or softened and then permitted to cool and harden after pipe 33 and ring 37 are in position.

Each cooling unit container is provided with the vertically spaced series of radiating fins 39 therearound by which heat is conducted from the space within cabinet 10 to the low temperature brine 25, to thereby more efficiently transfer heat to the brine and cool or lower the temperature of the space within the cabinet to be cooled and refrigerated.

An insulating material tray or solid carbon dioxide supporting plate 40 is provided for each container 23, and is placed over and covering the open upper end of the space or compartment 24 within the container. An insulating tray 40 is supported in position on the top wall 26 of the brine reservoir or compartment and is formed with a suitable opening for the inlet pipe 32 to extend upwardly therethrough. If desired, or as may be found expedient, a tray 40 is provided with a central opening 41 therethrough, or with a plurality of such openings. Trays of various thicknesses may also be utilized for the purpose of securing increased or decreased insulation, as will be explained hereafter.

A double walled, vacuum insulated, or so-called thermos jar or container 42, is mounted in inverted position with its open or mouth end lowermost, in each of the tubular or sleeve members 20, with its lower edge or mouth resting on the flange or shoulder 21, a suitable washer or the like 43 being mounted on shoulder 21 to engage and on which container or enclosure 42 is removably supported. The exterior diameter of each vacuum container 42 is uniform and such as to secure a relatively snug fit in the sleeve members 20, while the internal diameter of each container 42 is also uniform throughout the major portion of the container depth. The length or height of each of the vacuum insulated containers or enclosures 42, is such that, when in mounted position in one of the sleeve members or holders 20, the container extends upwardly a considerable distance above the cabinet top wall 11, in the present instance a distance of approximately half the length thereof, although the invention is not so limited.

Preferably, a thin and light weight metal, such as aluminum, protecting cap 44 is provided for mounting over and enclosing the portion of each container or enclosure 42 which extends above the cabinet. Each of said protecting caps 44 provides a space between its upper end and the upper end of the vacuum container 42 over which it is fitted, and a coiled expansion spring 45 is interposed therebetween and centered on and around the usual vacuum container tip. These springs 45 prevent the end of the vacuum containers from coming in contact with the ends of the cap, and also, can be placed in position under compression, if desired, to tend to maintain the containers in seated position on the shoulders 21 and washers 43. The caps 44 are secured, preferably removably, in any suitable manner to the upper ends of the sleeve or vacuum container holder members 20, respectively, or may, if so desired, simply rest loosely upon such sleeve members.

With the cabinet 10 constructed and arranged as above described, in operation and use thereof, the vacuum containers or enclosures 42 are removed from mounted position, and a block or cake of solid carbon dioxide 50, preferably of elongated form and of a diameter substantially conforming to the internal diameter of a vacuum container 42, although the invention is not restricted to any particular form of the solid refrigerant, is placed and supported upon the insulating tray or plate 40 on each cooling container 23 of the cooling units. A vacuum insulated container 42, with its protecting cap 44, is then placed in mounted position over, enclosing, and efficiently heat insulating each block of solid carbon dioxide 50, as will be clear by reference to the accompanying drawing, but with the lower end portion of each block of solid refrigerant in operative thermal relation with a cooling container 23 and the spaces or compartments within the cabinet to be cooled.

It is of course known that solid carbon dioxide sublimes, that is, passes directly from the solid to the gaseous state, and that the gas thus evolved has an extremely low temperature and a high specific gravity or density. It is further known that the carbon dioxide gas is a very efficient insulating medium, and that solid carbon dioxide when surrounded or enveloped in the gas is effectively insulated thereby against higher surrounding temperatures and its rate of sublimation is therefore retarded, so that the duration of the solid so enveloped is increased.

Now, in the cabinet 10, with the vacuum insulated containers 42 enclosing the blocks of carbon dioxide 50 and insulating the same from temperatures on the exterior of the cabinet, the lower end of each block sublimes into very cold gas, which being very dense passes from the space above the container 23 therebelow, into the inlet pipe 32 of coil 31, downwardly through the coil, and then outwardly through pipe 34 to atmosphere. The gas passing through coil 31 absorbs heat from the brine 25 and brings the brine to a low temperature, so that, by conduction through the outer walls of the container and the fins 39, the temperature in the refrigerating spaces within the cabinet are effectively cooled. The rate of cold carbon dioxide gas discharge and consequently the rate of sublimation of and refrigerating effect from the solid carbon dioxide can be controlled within limits by the valve 35, as well as by the thickness of the insulating tray or trays, 40, and the area of the openings 41 therein, on which the lower end of a carbon dioxide block 50 is supported. In this manner the brine 25 in each cooling container 23 is brought to and maintained at the desired low temperature, in effect accumulating cold and radiating it to the refrigerating space in the cabinet by absorbing heat therefrom. Through regulation of valve 35 and use of various thicknesses of insulating trays 40, the temperature of the refrigerating spaces in the cabinet can be controlled and maintained as may be desired.

When the space within the cabinet is brought to the desired low temperature, including the can receiving wells or compartments 17, covers 12 can be removed, and cans or containers C filled with the material to be refrigerated, say for example ice cream, placed within the cabinet received in compartments 17 at opposite sides of the cooling units or containers 23. The covers 12 are then placed in closing position and the material in cans C will be brought to and maintained at the desired low temperature.

As the blocks of solid carbon dioxide 50 sublime at their lower ends, they will of course by gravity drop or feed downwardly through the vacuum insulated enclosures 42, to maintain the lower ends of the blocks in the desired thermal relation with their respective cooling units. The space above each container 23 is sealed from the space to be refrigerated in the cabinet, so that, no gas passes in contact with material in the cabinet being refrigerated, the refrigerating space being cooled indirectly. Under certain conditions of operation and of regulation, gas diffused from the solid carbon dioxide may not escape at a sufficient rate from valve 35, so that the gas rises in the space above a container 23 around the vacuum container holding sleeve 20, and between such a sleeve and the adjacent wall 18. For such conditions, the gas escapes from the cabinet around the upper edge of the sleeve or holder member 20, which is so formed as not to make a gas tight joint with its seat.

By employing a plurality of solid carbon dioxide enclosing containers 42, with the cabinet 10 in operation, such containers can be alternately charged, so that there will be constantly a sufficient quantity of refrigerant at work to maintain a steady and desired temperature in the cabinet. The compartment 24 in each cooling unit container 23 is for the purpose of receiving solid carbon dioxide when starting operation of the cabinet so as to increase the refrigerating effect, as well as for the purpose of utilizing scraps or pieces of the solid carbon dioxide blocks 50 which may not have been completely evaporated when charging the cabinet with fresh blocks 50, thus further increasing the refrigerating capacity of the cooling units and eliminating waste of the solid carbon dioxide.

The mounting and arrangement of the vacuum insulated solid carbon dioxide containers or enclosures 42 extending upwardly above the cabinet provides for utilizing a maximum quantity of refrigerant efficiently and with minimum refrigerating loss, while enabling maximum space in the cabinet for refrigerating compartments. Obviously, only one container 42 may be used, or any desired number thereof; and similarly any desired number of cooling containers or units 23 may be employed. On the other hand, instead of separate containers 23, a single container and single body of low freezing point solution, with a plurality of solid carbon dioxide containers placing their respective refrigerant charges in operative thermal relation with such solution, can be provided; and all of such arrangements, as well as various others embodying the principles and various features of my invention, are contemplated and included thereby.

It is also evident that various other changes, modifications, variations, substitutions, additions, and eliminations might be resorted to without departing from the spirit and scope of my invention, and hence I do not wish to limit myself in all respects to the exact and specific disclosures hereof.

What I claim is:

1. In a refrigerating cabinet having a refrigerating space therewithin and a top wall formed with an opening therethrough, a cooling unit in the cabinet including a container having heat conducting walls in thermal relation with the refrigerating space and an open top alined with the cabinet opening, the interior of said container sealed from the refrigerating space, a support at the upper end of the container for receiving a block of solid carbon dioxide, and a vacuum insulated vessel having an open lower end, removably mounted in and closing the cabinet top opening, and extending into the cabinet over, enclosing and insulating a block of carbon dioxide on said support, said removable, insulated vessel in mounted position extending upwardly a distance on the exterior of the cabinet.

2. In a refrigerating cabinet, a cooling unit therewithin having an open top for receiving a block of solid carbon dioxide, the top of the cabinet formed with an opening therethrough above the cooling unit opening, a vacuum insulated enclosure removably mounted in and closing the cabinet opening, said closure extending into and fitting over and enclosing the upper end portion of a block of carbon dioxide in the unit to maintain the block with the lower end portion thereof exposed in thermal relation with the unit, said enclosure extended a distance upwardly from the cabinet, and a protecting cap member mounted over and covering the upwardly extended portion of said enclosure on the exterior of the cabinet.

3. In a refrigerating cabinet having a refrigerating space therein, a cooling unit in thermal relation with the refrigerating space for cooling the same, means for holding solid carbon dioxide in said unit for sublimation thereof and diffusion of cold gas in the unit, the interior of the unit sealed against passage of gas therefrom into the refrigerating space, a closed reservoir filled with a low freezing point fluid in said unit, a cooling coil passing downwardly through said fluid for flow of cold gas therethrough to cool the fluid, a conduit from the lower end of the coil to the exterior of the cabinet for discharge of gas from the coil and unit, and a valve in said conduit for regulating the rate of gas discharge from said conduit.

4. In a refrigerating cabinet having a refrigerating space therewithin, a cooling unit disposed in the cabinet and including a chamber having a low freezing point fluid therein and provided with heat conducting walls in thermal relation with the refrigerating space for cooling such space, the cabinet provided with a compartment above the cooling unit sealed from the refrigerating space and opening through the top of the cabinet, a cooling coil in the fluid in the chamber with its inlet end in the compartment above the container, said compartment above the cooling unit adapted to receive solid carbon dioxide for sublimation thereof and passage of the cold gas through said coil to lower the temperature of said low freezing point fluid, and a removable closure for the upper end of said compartment.

5. In a refrigerating cabinet and the like having a refrigerating space therewithin, a cooling unit disposed in the cabinet and providing a chamber having heat conducting walls in thermal relation with the refrigerating space, said chamber sealed from the refrigerating space and opening through the top of the cabinet, a removable closure for the open upper end of said cooling unit chamber, a low freezing point fluid in the lower portion of the chamber and the upper portion of the chamber adapted to receive a charge of solidified gas for sublimation thereof means being provided for circulating the cold sublimation gases to cool the fluid, and means sealed from the refrigerating space for conducting the cold gas from the cooling unit to the exterior of the cabinet.

6. In a refrigerating cabinet and the like having a refrigerating space therewithin, a cooling unit in thermal relation with the refrigerating space for cooling the same, means for holding a charge of solidified gas refrigerant in said unit for sublimation of said refrigerant in and diffusion of cold gas through the unit, a closed reservoir containing a low freezing point fluid in said unit cooled by circulation of said cold gases through the unit, a passage sealed from the refrigerating space for conducting gases directly from and after circulation thereof through the unit to the exterior of the cabinet, and a removable closure for the unit for charging the unit with refrigerant.

7. In a refrigerating cabinet and the like having a refrigerating space therein, a cooling unit in thermal relation with the refrigerating space for cooling such space, means for holding a charge of solidified gas refrigerant in said unit for sublimation thereof and diffusion of cold gas in the unit, said means providing a closure for the unit removable for charging the unit with refrigerant, the interior of the unit sealed against passage of gas therefrom into the refrigerating space, a closed reservoir filled with a low freezing point fluid in said unit, a cooling coil passing downwardly through said fluid for flow of cold gas therethrough to cool the fluid, and a conduit from the coil to the exterior of the cabinet for conducting gas from the coil and unit.

8. In a refrigerating cabinet and the like having spaced apart refrigerating compartments therein, cooling means disposed within the cabinet between and in thermal relation with said compartments, said means including a reservoir containing a low freezing point fluid and having heat conducting walls for transfer of heat from said compartments to said fluid to lower the temperature of the compartments, a chamber above said reservoir sealed from the refrigerating compartments for receiving a charge of solidified gas for sublimation therein, and means for conducting the cold gases of sublimation from said chamber in heat transfer relation with the fluid in said reservoir to cool the same.

9. In a refrigerating cabinet and the like having a refrigerating space therewithin, a container having heat conducting wall in thermal relation with the refrigerating space, a compartment sealed from the refrigerating space for receiving a solidified gas refrigerant for sublimation and evolution of cold gases therein, a low freezing point fluid in said container, and means for conducting the cold gases of sublimation from said compartment in heat transfer relation with said fluid to cool the latter, said means sealed from the refrigerating space and discharging at the exterior of the cabinet, said compartment provided with an opening through which the compartment is charged with refrigerant, and a removable closure for said compartment opening.

10. In a refrigerating cabinet and the like having a refrigerating space therein, a double walled container of heat conducting material in thermal relation with said refrigerating space, the interior of said container providing an open-top solidified gas holding space, a low freezing point fluid contained in the space provided by said double walls, a compartment above said container and opening thereinto but sealed from the refrigerating space, means for holding a charge of solidified gas in said compartment, and means for conducting the cold gases of sublimation from the solidified gas in said container and compartment through the fluid to cool such fluid.

11. In a refrigerating cabinet and the like, having a refrigerating space therewithin, a cooling unit in the cabinet in thermal relation with the refrigerating space for cooling such space, said unit including a container sealed from the refrigerating space and having a low freezing point fluid therein, said container provided with heat conducting walls for transfer of heat from the refrigerating space to the fluid, a solidified gas receiving compartment above and open at its lower end to said container but sealed from the refrigerating space, said compartment opening through the cabinet at its upper end and provided with a removable closure for such open upper end, and means for conducting the cold gases of sublimation from a solidified gas in said compartment through the fluid in said container to cool the same, said means discharging the gases to the exterior of the cabinet.

12. In a refrigerating cabinet, a cooling unit therewithin having an open top for receiving a block of solidified gas, the top of the cabinet formed with an opening therethrough above the cooling unit opening, enclosing structure extending between the container and the cabinet top opening to form a compartment sealed from the interior of the cabinet, and an inverted insulated container removably mounted in and closing the cabinet top opening, said container extending a distance into the compartment and adapted to fit over and enclose the upper end portion of a block of solidified gas in the cooling unit.

13. In a refrigerating cabinet providing a refrigerating space therewithin, a cooling unit within the cabinet in thermal relation with the refrigerating space and adapted to be cooled by a solidified gas refrigerant and the cold gases evolved by its sublimation, said unit providing for the passage of cold gas therethrough but sealed against escape of gas therefrom into the refrigerating space in the cabinet and a vacuum insulated vessel removably mounted in inverted position extending inwardly through the cabinet for fitting over and covering a charge of refrigerant in position in thermal relation with said unit, the said vessel extended in mounted position a distance outwardly on the exterior of the cabinet.

14. In combination in a refrigerating cabinet provided with a refrigerating space therewithin, a cooling unit disposed in thermal relation with the refrigerating space for cooling the same but having the interior of the unit sealed from such space, an inverted heat insulated vessel removably mounted extending into the cabinet above said unit with its lower end opening into the unit, said unit including means for supporting a charge of solidified gas refrigerant in thermal relation with the unit for cooling the same, and said inverted vessel adapted to fit down over and cover a charge of refrigerant on said means with the lower end portion of the refrigerant charge exposed for sublimation and passage of the cold gases into the cooling unit.

15. In combination in a refrigerating cabinet provided with a refrigerating space therewithin, a cooling unit including a container having heat conducting walls disposed in the cabinet in thermal relation with the refrigerating space, said container sealed from the refrigerating space but open through the top of the cabinet, a heat insulated inverted vessel adapted to fit down over and cover a charge of solidified gas refrigerant that is positioned with the lower portion thereof in the cooling unit exposed for passage of cold sublimation gases into the cooling container, and means for discharge of the gas from the cooling container to the exterior of the cabinet.

16. In a refrigerating cabinet having a refrigerating space therewithin, cooling means in thermal relation with the refrigerating space for cooling such space, a plurality of heat insulated vessels removably mounted in the top of and extending upwardly a distance above the cabinet on the exterior thereof, each of said vessels extending into the cabinet and having an open lower end in communication with said cooling means, each of said vessels adapted to fit down over and cover a charge of solidified gas refrigerant positioned in said cooling means for passage of cold sublimation gases from the lower portions of the refrigerant charges into and through said means for cooling the same, and the said cooling means sealed against escape of gases therefrom into the refrigerating space.

17. In a refrigerating cabinet having a refrigerating space therewithin, a cooling container having a low freezing point solution therein and provided with heat conducting walls disposed in the cabinet in thermal relation with the refrigerating space for cooling such space, the cabinet provided with a compartment above the cooling container sealed from the refrigerating space and opening through the top of the cabinet, a cooling coil in the low-freezing point solution in the container with its inlet in the compartment above the container, and a heat insulated vessel having an open lower end removably mounted in the cabinet closing the open upper end of said compartment above the cooling container, said heat insulated vessel adapted to extend down over and cover a charge of solidified gas refrigerant in said compartment for sublimation of the refrigerant and passage of the gas evolved from the compartment through said cooling container coil to lower the temperature of the solution.

18. In a refrigerating cabinet, a cooling unit therewithin having an open top for receiving a block of solidified gas refrigerant, the top of the cabinet formed with an opening therethrough, above the cooling unit opening, said cooling unit sealed from the interior of the cabinet, and an inverted heat insulated vessel removably mounted in and closing the cabinet top opening, said vessel extending a distance into the unit and adapted to fit over and enclose the major portion of a block of refrigerant in the cooling unit but exposing the lower end portion of the refrigerant block for sublimation and diffusion of cold refrigerant gases directly into the unit.

19. In a refrigerating cabinet and the like having a refrigerating space therewithin, a low freezing point solution sealed from but in heat transfer relation with the refrigerating space, means for holding a charge of solidified gas refrigerant in thermal relation with said solution for sublimation of the refrigerant and passage of the cold refrigerant gases in heat transfer relation with the solution, said refrigerant holding means sealed from the refrigerating space but provided with an opening for charging said means with refrigerant, a removable closure for said charging opening, and a passage sealed from the refrigerating space for conducting the refrigerant gases from the solution to the exterior of the cabinet.

20. In a refrigerating cabinet and the like having a refrigerating space therein, a double-walled container of heat conducting material within the cabinet in thermal relation with said refrigerating space, the interior of said container providing an open-top solidified gas receiving chamber, a low freezing point fluid contained in the space provided by said double walls, the cabinet providing a compartment above said container opening into the container chamber but sealed from the refrigerating space, and a removable support member between said chamber and compartment over and across the upper end of the chamber for receiving and holding a charge of solidified gas in the compartment above said chamber.

21. In a refrigerating cabinet and the like having a refrigerating space therein, a cooling unit providing a solidified gas receiving compartment within the cabinet in heat transfer relation with the refrigerating space but sealed against escape of gas into the refrigerating space, an insulating material plate member removably mounted in and across said compartment to divide the same into an upper and lower solidified gas receiving chamber, said plate providing a support for receiving and holding a charge of solidified gas in the upper chamber, and a body of low freezing point fluid interposed between the lower chamber and the refrigerating space in thermal relation with such space and the said solidified gas chamber.

22. In a refrigerating cabinet and the like having a refrigerating space therein, said cabinet provided with a solidified gas receiving compartment therewithin opening through the cabinet but sealed from the refrigerating space, the lower portion of said compartment having a body of low freezing point fluid in thermal relation therewith, said body of fluid in thermal relation with the refrigerating space for heat transfer from such space to the solidified gas compartment, and means for passing refrigerant sublimation gases from said solidified gas compartment through said body of low freezing point fluid to refrigerate the fluid.

23. In a refrigerating cabinet and the like structure providing a refrigerating space therewithin, a cooling unit in heat transfer relation with the refrigerating space for cooling such space, the interior of the cooling unit sealed from the cooling space but accessible through the cabinet from the exterior thereof, means for maintaining a charge of solidified gas refrigerant in said unit for sublimation of refrigerant and passage of cold sublimation gases through the unit, said unit including a body of low freezing point fluid in heat transfer relation with the refrigerating space, means for passing the cold sublimation gases through said fluid for cooling the fluid, and means sealed from the refrigerating space for conducting the sublimation gases from the cooling unit to and discharging the same at the exterior of the refrigerating space.

24. In a refrigerating cabinet and the like structure, a cooling unit therewithin having an open top for receiving a block of solidified gas refrigerant, the top of the cabinet structure formed with an opening therethrough above the cooling unit opening, and a heat insulated enclosure removably mounted in and closing the cabinet opening, said enclosure extending into the cooling unit and adapted to fit down over and enclose the upper portion of a block of refrigerant in the unit with the lower end portion of the refrigerant block exposed in thermal relation with the unit.

25. In a refrigerating cabinet and the like structure having a refrigerating space therewithin, a solidified gas refrigerant support at the under side of the cabinet structure top wall within the refrigerating space but sealed therefrom, said refrigerant support providing a cooling unit having a heat conducting wall in heat transfer relation with the refrigerating space, an opening through the cabinet structure top wall into said cooling unit for receiving a block of refrigerant supported on said refrigerant support, and a heat insulated enclosure removably mounted in and closing said top wall opening and adapted to fit down over a block of refrigerant on said support, said enclosure at its lower end spaced from the refrigerant support exposing the lower portion of the refrigerant block for sublimation and passage of gases into the support between the lower end of the enclosure and the adjacent wall of the support therebelow.

26. In a refrigerating cabinet and the like structure having a refrigerating space therewithin, the upper wall of the cabinet structure provided with an opening therethrough into the refrigerating space, an open top solidified gas refrigerant container within the refrigerating space beneath and in downward extension of the inner end of said opening, said container including heat conducting walls in heat transfer relation with the refrigerating space and, together with the top wall opening, sealed against escape of gas therefrom into the refrigerating space, and a heat insulated refrigerant enclosure mounted in and closing said wall opening, the said enclosure extending down through the wall opening to the container for fitting down over and heat insulating a block of solidified refrigerant in the container but exposing the lower end of the refrigerant block for sublimation in thermal relation with the container, the structure providing for sublimation gas escape from the refrigerant container.

27. In a refrigerating cabinet having a refrigerating space therewithin, a cooling unit having a heat conducting wall in thermal relation with the refrigerating space for cooling such space, said cooling unit having its interior sealed from the refrigerating space and having an open top alined with an opening in the upper wall of the cabinet, a support on the cooling unit for a block of solidified gas refrigerant, and a vacuum insulated closure for removable mounting in and closing the cabinet upper wall opening, said closure extending into the cabinet and adapted to extend down over and enclose and insulate a block of refrigerant resting on said support with the lower end of such block in thermal relation with the cooling unit.

28. In a refrigerating cabinet and the like having a refrigerating space therewithin, a wall of the cabinet provided with an opening therethrough, a closed structure within the refrigerating space providing a solid refrigerant receiving compartment sealed from the refrigerating space and opening to the exterior of the cabinet through said wall opening, said structure including a wall providing for heat transfer from the refrigerating space to the refrigerant compartment, and a removable closure for said wall opening and refrigerant compartment, including a heat insulated solid refrigerant enclosure extending into the compartment over and heat insulating a block of solid refrigerant in the compartment with the refrigerant in thermal relation with the heat transfer providing wall of the compartment.

29. In a refrigerating cabinet and the like having a refrigerating space therewithin, said cabinet provided with a solidified gas refrigerant receiving compartment therein opening through the cabinet but sealed from the refrigerating space, a body of low freezing point fluid in thermal relation with said compartment, and in thermal relation with the refrigerating space for heat transfer from the refrigerating space to said refrigerant compartment, and means for passing refrigerant sublimation gas from the refrigerant compartment in heat transfer relation with said body of low freezing point fluid.

30. In a refrigerating cabinet and the like having a refrigerating space therein, a structure providing a solidified gas refrigerant compartment in the refrigerating space in heat transfer relation therewith but sealed from the refrigerating space, said compartment opening through the cabinet for access thereinto from the exterior of the cabinet, a vacuum insulated vessel removably mounted in inverted position in the compartment opening through the cabinet, said insulated vessel extending into the compartment and adapted to extend over and enclose a block of refrigerant in the compartment with the refrigerant in thermal relation with the compartment, said vessel extended a distance outwardly beyond the cabinet in normal mounted position thereon, and means for conducting the refrigerant sublimation gases from the compartment to the exterior of the cabinet.

31. In a refrigerating cabinet and the like having a refrigerating space therein, a structure providing a solidified gas refrigerant receiving compartment in the refrigerating space in heat transfer relation therewith but sealed from the said space against passage of refrigerant gas thereinto, said cabinet providing an opening therethrough into said compartment from the exterior of the cabinet, and a heat insulated vessel removably mounted in inverted position extending through the cabinet opening into said compartment and adapted to fit over and enclose a block of solidified gas refrigerant therein with the refrigerant block in thermal relation with the compartment through the inner end of said vessel, there being means provided for conducting refrigeration sublimation gases from the said compartment.

32. In a refrigerating cabinet and the like having a refrigerating space therein, a solidified gas refrigerant supporting structure at the under side of the cabinet top wall within said refrigerating space but sealed therefrom, said refrigerant supporting structure including a heat conducting wall portion in thermal relation with the refrigerating space and with a refrigerant in said supporting structure, said cabinet top wall having an opening therethrough into said refrigerant supporting structure for receiving a block of refrigerant in said supporting structure, and a heat insulated enclosure removably mounted in and forming the closure for said top wall opening, said removable enclosure extending into the refrigerant supporting structure and adapted to enclose and insulate a block of refrigerant in said supporting structure, the lower end of said removable enclosure within the refrigerant supporting structure providing for flow of refrigerant gas from the enclosure into the refrigerant supporting structure.

33. In a refrigerating cabinet and the like having heat insulating walls providing a refrigerating space within the cabinet, a wall of the cabinet formed with an opening therethrough, a closed structure projected a distance into the refrigerating space from the inner surface of that cabinet wall having the opening therethrough and providing a solidified gas refrigerant receiving compartment sealed from but in heat transfer relation with the refrigerating space and opening to the exterior of the cabinet through said wall opening, said projected structure including within the refrigerating space a wall portion of high heat conductivity in thermal relation with the refrigerating space for transferring heat therefrom to a refrigerant within the compartment, and a heat insulated removable closure for said wall opening and the refrigerating compartment, said closure providing an outwardly extended heat insulated space therewithin in continuation of the portion of the refrigerant compartment within the refrigerating space whereby to receive and heat insulate that portion of a block of refrigerant in the refrigerant compartment that extends outwardly from such compartment within the refrigerating space.

34. In a refrigerating cabinet and the like having heat insulated walls defining and enclosing a refrigerating space within the cabinet, the insulated wall of said cabinet that provides the top wall of said space of considerable thickness relative to the depth of the space and formed with a passage therethrough opening from the exterior of the cabinet into the refrigerating space, a refrigerant receiving and holding structure extending from the inner side of said insulated top wall a distance into the refrigerating space and forming a compartment sealed from the refrigerating space in continuation of said wall passage, the outer surface of said structure within the refrigerating space directly exposed in thermal relation with the space and including a wall portion of high heat conductivity for transfer of heat from the space to a refrigerant within the compartment, the top wall passage forming an outward extension of said refrigerant compartment whereby a block of refrigerant of considerable length may be received in the compartment at its lower end with the upper portion of the block received in the wall passage and enclosed and heat insulated by said top wall and a removable heat insulated closure for the outer end opening of said wall passage to close such passage and complete the heat insulation of a block of refrigerant in said refrigerant compartment and passage.

ERNEST DU BOIS.